(No Model.)
W. S. FRAZIER.
SULKY.
No. 251,106.  Patented Dec. 20, 1881.
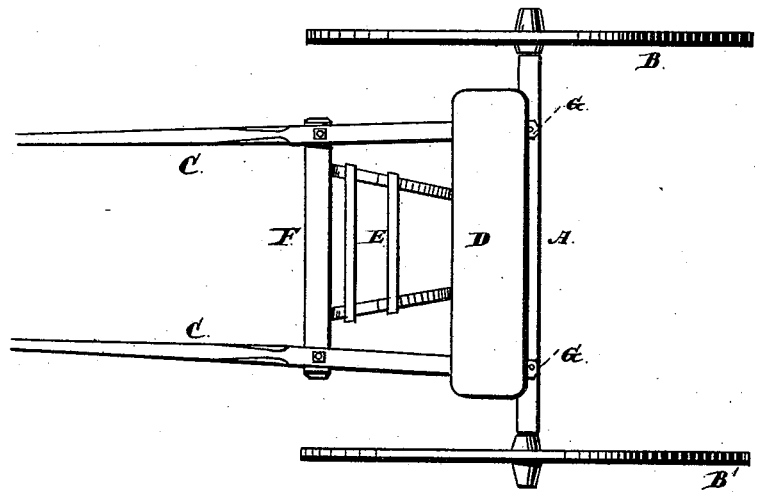
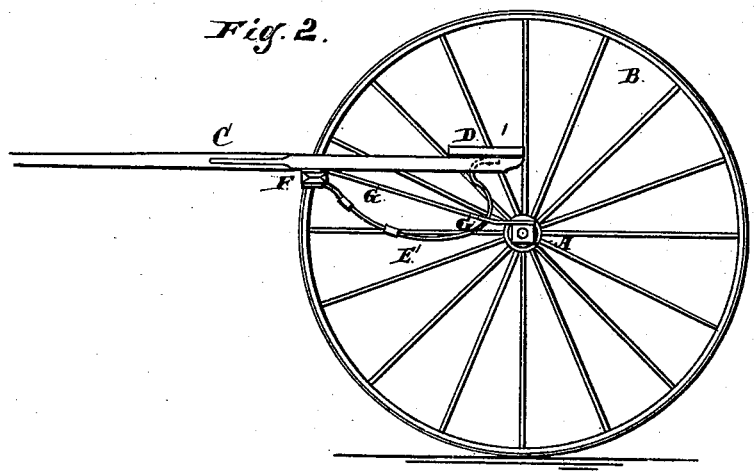
Witnesses:
Albert H. Adams.
Edgar T. Bond
Inventor:
Walter S. Frazier
By West & Bond
His Attys.

UNITED STATES PATENT OFFICE.

WALTER S. FRAZIER, OF AURORA, ILLINOIS.

SULKY.

SPECIFICATION forming part of Letters Patent No. 251,106, dated December 20, 1881.

Application filed July 2, 1881. (No model.)

*To all whom it may concern:*

Be it known that I, WALTER S. FRAZIER, residing at Aurora, in the county of Kane and State of Illinois, and a citizen of the United States, have invented a new and useful Improvement in Sulkies, of which the following is a full description, reference being had to the accompanying drawings, in which—

Figure 1 is a top or plan view; Fig. 2, a side elevation with the wheel B' removed.

The object of this invention is to so construct a sulky or two-wheeled vehicle that the seat and foot-rest will maintain their respective positions, and to improve the construction of such vehicles; and its nature consists in supporting the shafts and seat upon springs extending forward from the axle, so as to give them a free vertical movement without disturbing the relative positions of the seat and foot-rest.

In the drawings, A indicates the axle; B B', the wheels; C, the shafts; D, the seat; E, the foot-rest; F, the cross-bar of the shafts; G, the springs.

The axle A and wheels B B' may be made in any of the usual or well-known forms. In this construction the shafts C are extended back, so as to support the seat, as shown, and they are connected with the axle by the spring-bars G. The spring-bars, as shown, are single bars connected at their rear ends with the axle and at their front ends with the shafts at the cross-bar F; but their front ends may be separately connected by suitable clips at any proper point along the length of the shafts, sufficiently far forward to give the springs their desired action. As shown, the springs G are located directly underneath the rear ends of the shafts; but, if desired, they may be further spread on the axle, so as to strengthen the bracing effect of their somewhat inclined positions.

The foot-rest E is supported upon bars connected with the cross bar or shafts at their front ends and with the seat at their rear ends. The bars supporting the foot-rest are given the proper curve to bring the foot-rest to the position below the shaft-line, as shown, and to clear them from contact with the axle. The particular curve or bend of the rear end of these foot-rest-supporting bars will depend somewhat upon the forward or back position of the seat. As shown, the foot-rest is composed of bars or slats; but it may be made continuous by using boards or by bringing a sufficient number of slats together, or otherwise.

What I claim as new, and desire to secure by Letters Patent, is—

The springs G, in combination with the axle A, shafts C, and suspended foot rest or support E, substantially as specified.

WALTER S. FRAZIER.

Witnesses:
  B. A. PRICE,
  ALBERT H. ADAMS.